United States Patent [19]

Rappange et al.

[11] 4,360,207
[45] Nov. 23, 1982

[54] HEATER FOR SLIDING SEAL STRUCTURE

[75] Inventors: Adelbert Rappange, Kleindöttinger; Robert Richard, Zürich; Roland Stelzer, Würenlos, all of Switzerland

[73] Assignee: BBC Brown, Boveri & Company, Limited, Switzerland

[21] Appl. No.: 154,380

[22] Filed: May 29, 1980

[30] Foreign Application Priority Data

May 31, 1979 [CH] Switzerland .............. 5072/79

[51] Int. Cl.³ ............................................. F16S 15/34
[52] U.S. Cl. ............................ 277/22; 277/81 R
[58] Field of Search ........................ 277/81 R, 22

[56] References Cited

U.S. PATENT DOCUMENTS 2,992,838 7/1961 Wallace ............................ 277/22
3,269,735 8/1966 Whittaker ......................... 277/22
4,145,059 3/1979 Imai et al. ....................... 277/81 R

FOREIGN PATENT DOCUMENTS 1765843 10/1971 Fed. Rep. of Germany.
448809 6/1936 United Kingdom.

*Primary Examiner*—Robert I. Smith
*Attorney, Agent, or Firm*—Ostrolenk, Faber, Gerb & Soffen

[57] ABSTRACT

A sliding seal assembly is provided to admit an operating shaft into the sealed high pressure housing of the interrupter of a high voltage circuit breaker. A heater is contained in the assembly and is coupled to the seals by heat conductive members to maintain the seals at a high enough temperature to ensure their integrity even when the external temperature falls below −55° C.

5 Claims, 1 Drawing Figure

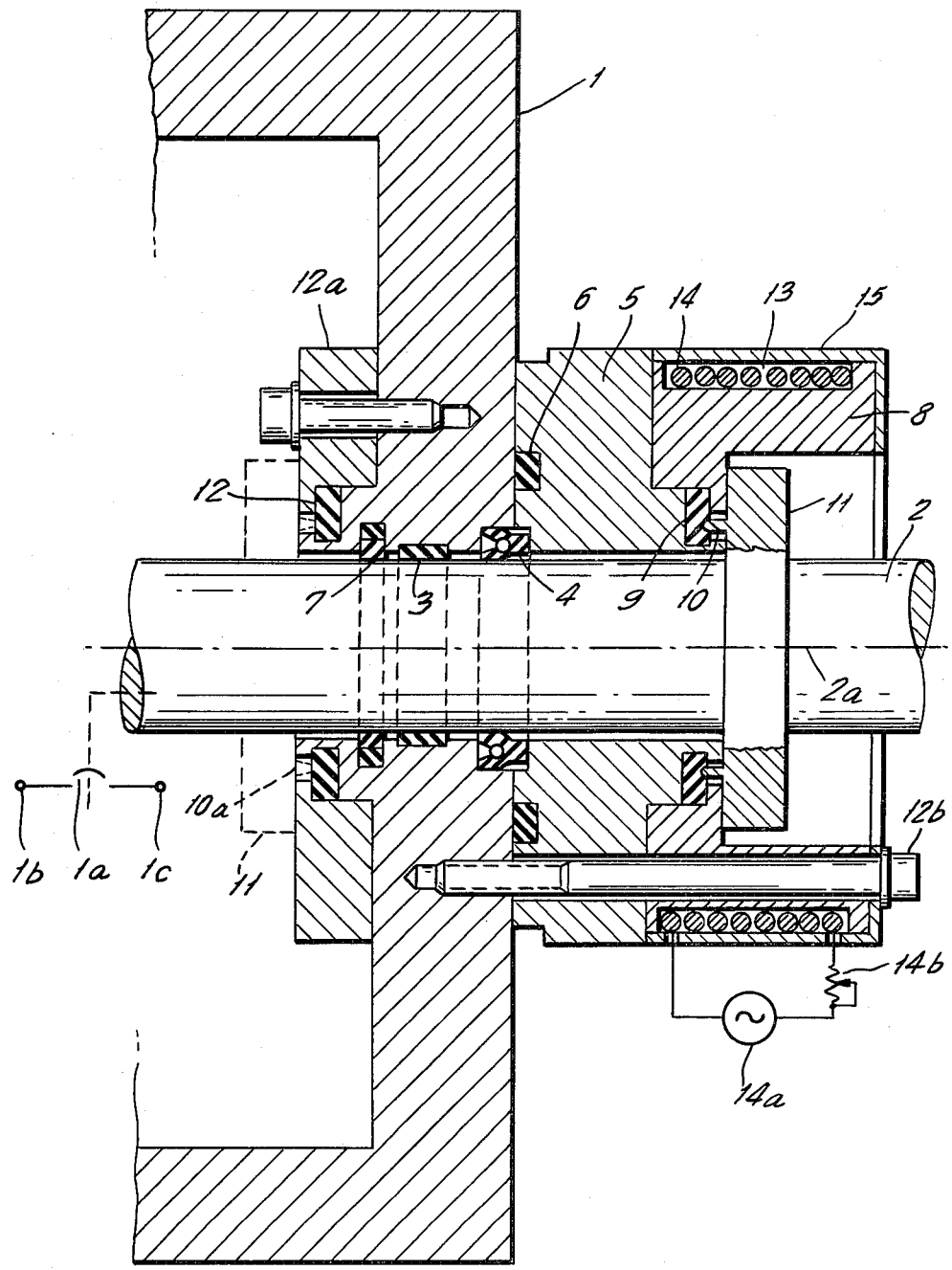

HEATER FOR SLIDING SEAL STRUCTURE

BACKGROUND OF THE INVENTION

This invention relates to a seal assembly for a movable shaft which enters a housing filled with a pressurized insulating fluid and more particularly relates to a heated seal assembly for the contact actuating rod of a high voltage gas insulated interrupter of an outdoor circuit breaker in which at least one gasket seal means is provided to permit the shaft to move relative to the interrupter housing while preventing the leakage of insulating fluid from the interior of the housing.

Seal assemblies for permitting the entry of a shaft to a pressurized housing and to permit movement of the shaft relative to the housing without allowing leakage of the pressurized gas within the housing are shown, for example, in DE-OS 27,37,726 (an unexamined German Patent Application). It has been found that seals of the type disclosed in the above noted German Unexamined application may not work satisfactorily at very low temperatures which may be reached by outdoor circuit breakers exposed to Artic environmental conditions. Thus at very low temperatures conventional rubber type gasket seals can become brittle and leaky.

BRIEF DESCRIPTION OF THE INVENTION

The object of the present invention is to create a novel seal assembly which can be easily manufactured and assembled and which is operational even at extremely low temperature conditions at which normal rubber-type seal structures can become brittle and ineffective; for example, temperatures of less than about $-55°$ C.

In accordance with the present invention a novel seal assembly is provided which incorporates a heating member which can generate heat which is conducted to the seals of the seal assembly to keep them relatively warm and flexible even though the external temperatures are so low that the seals would otherwise become brittle. An outdoor circuit breaker employing gasket seal assemblies for permitting the introduction of a movable operating shaft to the interrupter housing of the device will then be operable even though the outdoor temperatures might be lower than $-55°$ C.

The novel heater means of the assembly can take the form of an electrically heated coil which surrounds a metallic or other heat conductive assembly which extends from the heater coil to the gasket seals which are to be heated to provide an effective heat conduction path from the heat source to the seals. The electrically heated coils can be energized from low voltage control power sources in any desired manner. Other types of heat sources could also be used.

The novel arrangement of the invention produces numerous advantages including the following:

1. The seal assembly will be leak-free even at very low temperature.
2. The construction of the seal assembly is relatively simple.
3. Traditional sealing materials and commercially available gaskets such as those of ethylene-propylene rubber can be used even though their environment is an Artic-type environment with temperatures of less than $-55°$ C.
4. The construction of the seal assembly is such that seals may be easily inspected and replaced if necessary.
5. The novel arrangement of the invention is such that the heater unit can be installed and removed even though the circuit breaker with which it is associated is closed.
6. The seal assembly heater requires relatively low heating power which can be easily provided by auxiliary sources which are normally associated with outdoor circuit breakers.
7. If desired, the power applied to the heater can be automatically controlled in accordance with external temperature so that heater power can be reduced or turned off when the external temperature is higher than some given value.
8. The arrangement of the invention permits heating of all of the seals of a seal assembly including sliding seals as well as static sealing members.

BRIEF DESCRIPTION OF THE DRAWING

The single drawing shows in cross-section a portion of the housing of a gas insulated circuit interrupter and the seal assembly of the invention and the movable shaft which enters the housing to operate the interrupter.

DETAILED DESCRIPTION OF THE DRAWING

Referring to the drawing there is illustrated in cross-section a housing 1 which can be the housing of a conventional sulfur hexafluoride gas insulated interrupter structure which contains sulfur hexafluoride insulating gas under greater than atmospheric pressure, for example, at three atmospheres. Contained within the housing 1 is the schematically illustrated interrupter contact 1a connected between terminals 1b and 1c which would be accessible through the housing 1. A plurality of interrupters are then provided with conventional auxiliary equipment to define an outdoor circuit breaker which may be mounted in a harsh outdoor environment which, for example, could be an Artic region where extremely low temperature can be reached.

In order to operate the contacts within the interrupter housing 1, there is provided an operating shaft 2 connected to the interrupter contacts 1a as schematically illustrated by the dotted line. Shaft 2 is connected to a conventional operating mechanism (not shown) which is a part of the circuit breaker, and can be moved in an axial direction along the axis 2a from the position illustrated in the drawing which represents a contact closed position, to a position to the right which represents a contact open position, as will be later described. Note that the shaft 2 can be an operating shaft which rotates about its axis in order to operate the interrupter contacts 1a rather than a shaft which moves axially along its axis.

Operating shaft 2 is slidably received in a conventional circular bearing 3 which is contained in an opening in the housing 1 as shown. The housing opening is then sealed by a conventional slide seal which, in the drawings is illustrated as a double lip slide seal 4, which forms a seal between the outer periphery of shaft 2 and the inner periphery of the opening in housing 1 which receives the shaft. Slide seal 4 may conventionally be of ethylene propylene rubber.

A metal or other heat conductive material cylinder or ring 5 is provided to support the side of seal 4 and presses seal 4 between a notch in the opening in housing 1 and the outside surface of shaft 2. Cylinder 5 also contains a static face seal 6 which is compressed to define a seal between the stationary clamped surfaces of housing 1 and ring 5.

Since the interior of housing 1 contains arc interrupter contacts it is possible that during the operation of the interrupter the arc which is formed will decompose small amounts of the sulfur hexafluoride gas within the interior of the interrupter and produce decomposition products. In order to prevent the decomposition products generated within the interior of housing 1 from reaching the bearing 3 or seal 4, a strip seal 7 is arranged between the bearing 3 and the interior of housing 1. This seal will serve as a bulk seal to prevent decomposition products from coating the bearing 3 or the slide seal 4.

The main metal seal ring 5 receives a seal holder ring 8. The seal holder ring 8 has an inwardly projecting flange which is used to clamp pressure seal 9 between the ring 8 and the ring 5 as illustrated. Pressure seal 9 is dimensioned to receive a projecting annular ring 10 which projects from flange 11 which is secured to shaft 2 and moves with the shaft 2. Thus, when the interrupter contacts are closed and the shaft 2 is in the position shown in the drawing, projecting ring 10 presses into the seal 9 to form a good seal against the leakage of gas or other fluid from the interior of housing 1 to the exterior of the housing. A similar flange 11a shown in dotted lines in the drawing is fixed to the shaft 2 and is located far to the left of the drawing when the contacts are closed. Flange 11a carries a annular sealing projection 10a which seals against the annular seal 12 when shaft 2 moves to the right to open contacts 1a. Thus, when the ring 10a engages seal 12 and the interrupter is open, the seal between members 9 and 10 opens, but a positive seal between members 10a and 12 now prevents the leakage of gas through the annular space surrounding the shaft 2.

Seal 12 is held in position by a support ring 12a which is suitably bolted to the interior the housing 1. Both rings 5 and 8 are fixed relative to one another and to the housing 1 by a ring of bolts such as the bolt 12b. Thus, these elements of the sealing assembly of the invention can be easily connected or removed from the interrupter housing 1.

The seal holder 8 is provided with an annular groove 13 in its outer periphery. In accordance with the invention, heating members are disposed in this groove and may consist of heater coils, heating sleeves or other heating members which can be in strip, cord or plate form. An annular cover 15 is then provided to cover the heater element 14 and is secured in place in any desired manner. Preferably, the cover 15 is of a non-metallic or other non-heat conduction material to prevent heat transfer from the heater element 14 to regions exterior of the cover 15.

The seal holder 8 and ring-shaped member 5 are both metal members and are therefore relatively good heat conductors. Consequently, when the heater coil 14 is heated as by the application of a local control voltage source 14a to the terminals of coil 14, heat will be conducted to the sliding seal 4 as well as to the other seals including seal 9, seal 6 and seal 12. The amount of heat produced can be adjusted, for example, by an adjustable resistor 14b in series with the voltage source 14a where the adjustable resistor 14b can be manually controlled or automatically controlled in accordance with external temperature conditions.

In operation the heater 14 will produce sufficient heat to maintain at least the seal 4 and preferably all of the seals of the sealing assembly at temperatures above the temperature at which the seals will become brittle and leaky. For example, it has been found that for high voltage power circuit breakers which employ sulfur hexafluoride gas interrupters rated in a voltage range of up to 500 kilovolts and using a slide seal of ethylene propylene rubber, a heater power of about 150 watts can keep the temperature of the slide seal 4 higher than $-30°$ C. even though the external temperature is less than $-55°$ C. At $-30°$ C. the seal 4 is capable of maintaining its integrity and flexibility to prevent or to keep the leakage of pressurized sulfur hexafluoride with the interrupter housing 1 below an acceptable value.

It will also be apparent that by appropriately dimensioning the various metal heat conducting parts and by appropriately adjusting the heater power that all of the seals of the seal assembly, as shown in the drawing, can be kept relatively warm as compared to the environmental temperature of the circuit breaker.

As pointed out previously, the novel invention is applicable to seals which would permit the rotation of shaft 2 as well as those permitting its axial motion. In the case of a rotating shaft arrangement, the bearing 3 would be replaced, for example, by a needle bearing, while the slide seal 4 would be replaced by a conventional rotary seal. It would also be desirable in the embodiment incorporating a rotary shaft in place of the axial moving shaft to provide a roller bearing on the side of the radial seal facing away from the needle bearing.

Although a preferred embodiment of this invention has been described, many variations and modifications will now be apparent to those skilled in the art, and it is preferred therefore that the instant invention be limited not by the specific disclosure herein but only by the appended claims.

What is claimed is:

1. A seal assembly for sealing the opening between the outer periphery of a movable shaft and an opening in the wall of a housing which permits entry of said movable shaft into the interior of said housing; said movable shaft having a longitudinal axis; said housing being filled with a fluid under positive pressure; said seal assembly including a pliable annular seal which surrounds said shaft and slidably engages the outer surface of said shaft to permit relative movement between said pliable annular seal and said shaft; heat conductive ring means supporting said pliable annular seal and pressing said seal against said housing and fixing said seal against the interior of said opening in said housing; and electrically energizable heater means connected to said heat conductive ring at a location physically removed from said pliable annular seal and in thermal conduction relation with respect to said seal for heating said seal to maintain the sealing properties of said seal and to prevent said seal from leaking under low temperature conditions which would make said seal ineffective in the absence of the thermal energy applied to said seal by said heater means and second seal ring means disposed on said heat conductive ring means and concentric with said opening in said housing; said second seal ring means being a static compressed seal; said second seal ring means being heated by heat produced by said heater means and conducted thereto by said heat conductive ring means to maintain the sealing properties of said second seal ring means and to prevent said second seal ring means from leaking under low temperature conditions; said annular seal and said second seal ring means being coaxial with one another and each being disposed in a common plane; said common plane being perpendicular to said longitudinal axis of said shaft; a third seal ring means disposed on said heat conductive ring means and concentric with said opening in said housing; said third seal means comprising a face seal adapted to receive a cooperating seal member secured to said shaft; said seal member secured to said shaft being adapted to engage said third seal means when said shaft is in a given end position.

2. The assembly of claim 1, wherein said shaft is an axially movable shaft.

3. The assembly of claim 1, wherein said heater means is formed around the outer periphery of said ring means.

4. The assembly of claim 3 which includes heat-insulative cover means surrounding and enclosing said heater means.

5. The assembly of claim 1, wherein said seal is of ethylene-propylene rubber and wherein said heater means maintains said seal means at a temperature in excess of $-30°$ C.

* * * * *